March 6, 1928.
W. S. WARD ET AL
1,661,779
BATTERY CRADLE FOR ELECTRIC TRUCKS
Filed June 27, 1923
2 Sheets-Sheet 1
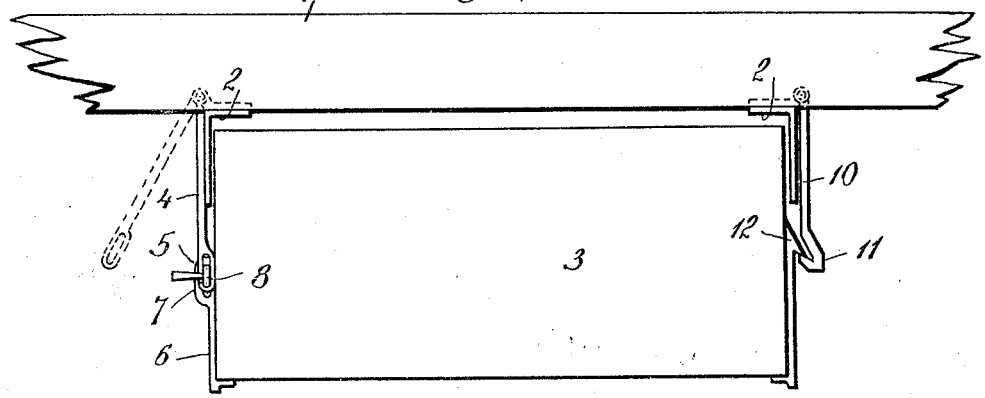
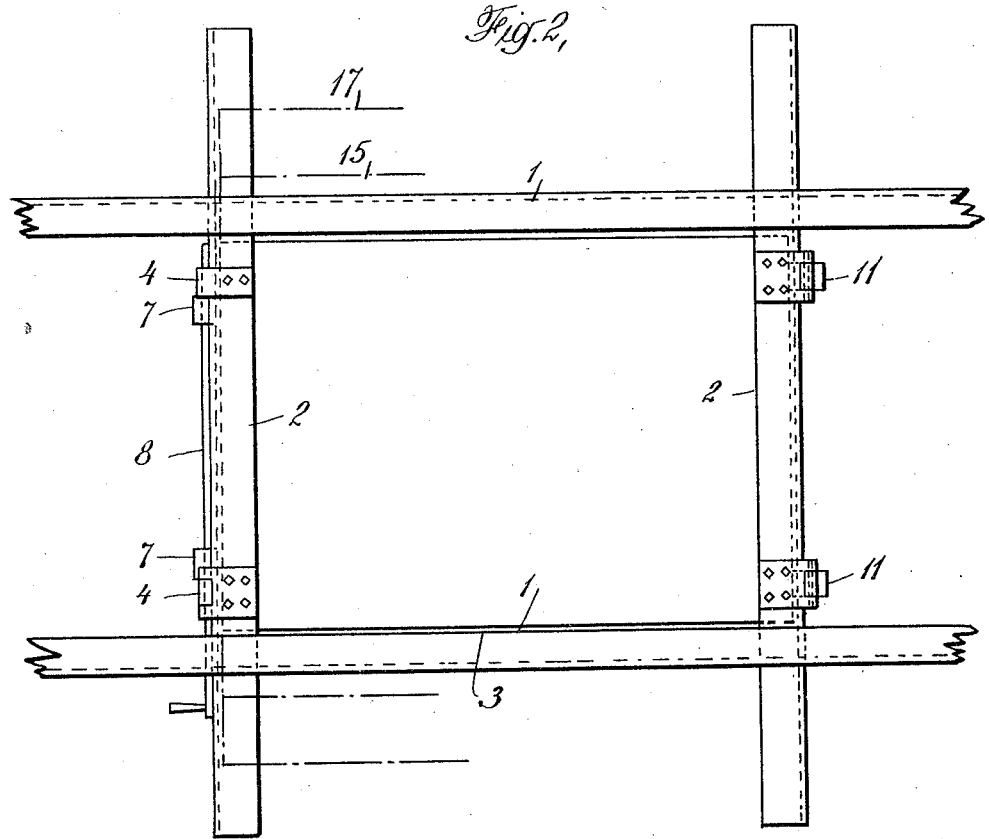
INVENTORS
Walter S. Ward
Benjamin H. Britt
BY
Pennie Davis, Marvin and Edmonds
ATTORNEY March 6, 1928.  W. S. WARD ET AL  1,661,779

BATTERY CRADLE FOR ELECTRIC TRUCKS

Filed June 27, 1923  2 Sheets-Sheet 2

INVENTORS
Walter S. Ward
Benjamin H. Britt
BY
Pennie, Davis, Marvin and Edmonds
ATTORNEY Patented Mar. 6, 1928.

1,661,779

UNITED STATES PATENT OFFICE.

WALTER S. WARD AND BENJAMIN H. BRITT, OF NEW YORK, N. Y., ASSIGNORS, BY MESNE ASSIGNMENTS, TO COMMERCIAL TRUCK COMPANY, OF PHILADELPHIA, PENNSYLVANIA, A CORPORATION OF PENNSYLVANIA.

BATTERY CRADLE FOR ELECTRIC TRUCKS.

Application filed June 27, 1923. Serial No. 647,997.

This invention relates to electrically driven vehicles and has to do particularly with the arrangement and construction of the battery and its manner of support.

Electically propelled vehicles, particularly the so-called electric trucks, are being used commercially to a great extent and their use is continually increasing due primarily to certain inherent advantages possessed by electrically driven vehicles which are lacking in gasoline propelled trucks. The electric motor vehicle is especially favored as a delivery truck due in large measure to its economical operation. Its economy in this field results largely from the fact that when the truck is standing still no power is being used, whereas in a gasoline engine driven vehicle, for instance, the engine is usually permitted to idle during a stop with the result that on a day's run a considerable amount of fuel is consumed while the vehicle itself is at rest. It is particularly to electrically driven delivery trucks of the above type that this invention relates, although it is also applicable to any other type of electrically propelled road vehicle.

The power for driving an electric truck is derived from a storage battery usually mounted beneath the truck body and supported by the chassis of the vehicle. One or more suitable electric motors are arranged in driving connection with the rear wheels of the truck and the power is supplied to the motors through appropriate electrical connections with the battery. A considerable amount of power is required to drive a loaded truck of this type. Consequently the storage battery must be of very substantial dimensions in order that it will be capable of furnishing the magnitude of current required and will at the same time have a sufficient ampere hour capacity to permit of a reasonably great driving radius from the battery charging station.

The driving battery itself consists of a number of individual storage cells, which cells are placed in a suitable box or support provided with hangers adapted to engage with cooperating loops or brackets provided on the chassis of the truck. The battery is usually positioned behind the front wheels of the truck and as close to them as is convenient. Behind the battery the driving motors are mounted and these motors are usually connected with the rear axle through driving chains which extend from the motors down to suitable sprockets associated with the rear wheels. The space beneath the truck is utilized to the fullest extent in order that room for all the necessary parts may be provided. The length of the battery is minimized in so far as is consistent with satisfactory operation, and due to the fact that the battery is supported from the chassis bars, its width is usually about equal to the distance between these bars. In designing the battery and arranging for its mounting in the truck it is also necessary to provide for a reasonable clearance between the bottom of the battery box and the road, which distance will of course vary somewhat, depending on whether the truck is to be operated over smooth pavements or on country roads.

Electric trucks of standard make now on the market are commonly open to the objection that the battery frequently is not of sufficient capacity to meet the maximum power demands of the service in which the truck is used. This difficulty arises from the fact that manufacturers are inclined to minimize the size of the battery in order that it can be mounted readily on the truck in the space available for it. Each truck as sent out from the factory is of course provided with a battery of predetermined capacity, which battery is deemed sufficient for the power requirements of the truck upon which it is carried. The battery provided with the truck is usually satisfactory for normal operation, that is for operating conditions in which the truck carries a normal load over roads whose condition is reasonably good and which are not excessively hilly and negotiates a route whose length does not exceed the distance which the truck is designed to travel without recharging of the batteries. When, however, these normal conditions are varied, for instance by putting the truck on a route which has one or more excessively long or steep hills, the difficulty of the truck not being able to negotiate the hill with a full load is frequently met. Such difficulties, of course, arise due to the fact that the battery is incapable of delivering to the motors sufficient power, and this difficulty cannot be remedied without increasing the size of the battery.

It is the intent of this invention to so constitute the battery, its support and other associated parts that the inability of the truck to negotiate hills or other abnormal conditions encountered on its route will be avoided. To this end we construct the battery support in such a fashion that the width of the battery required to be carried is not fixed, and we so arrange the individual parts of the battery itself that an increase in the capacity of the battery may be effected by increasing its size along only that dimension which is permitted by the battery support. By this means, therefore, each truck is capable of carrying batteries extending over a reasonably wide range of capacity. The substitution of a battery of one capacity for one of a different capacity is accomplished without altering in any way the structure of the battery cradle or support, or without any other alteration in the parts of the vehicle. All that is necessary is to remove the battery which is in the truck and introduce a new battery, the operation being carried on in exactly the fashion that a spent battery is removed and a freshly charged battery introduced.

It is also an object of the invention to provide in combination with this feature battery hangers of such construction that when the battery is in its final position on the truck the top of the battery box lies in close proximity to the under side of the truck, and which at the same time is securely locked in position so that displacement due to lateral or lengthwise shifting of the box is prevented, as is also danger of the battery jumping out of place due to jolting over irregularities in the road surface.

We have illustrated a preferred embodiment of our invention in the accompanying drawings wherein Fig. 1 is a side elevational view showing our improved battery and support in position upon the chassis of the vehicle.

Fig. 2 is a plan view illustrating our battery and support in position on the vehicle.

Figure 3:
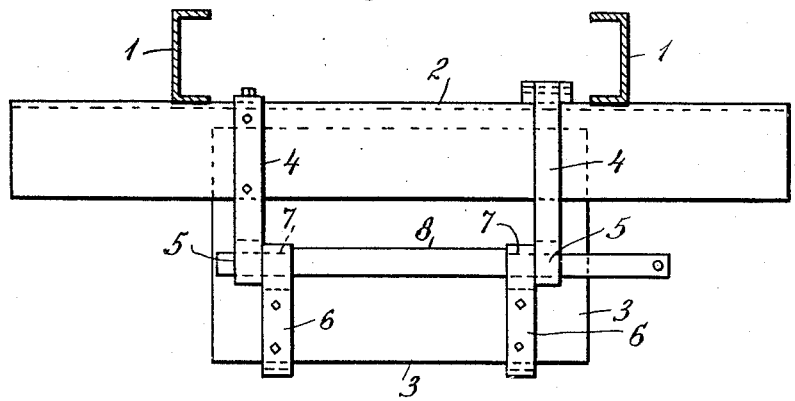
Figs. 3 and 4 are elevational views taken transversely of the vehicle and illustrating in some detail the manner of supporting the battery.
Figure 4:
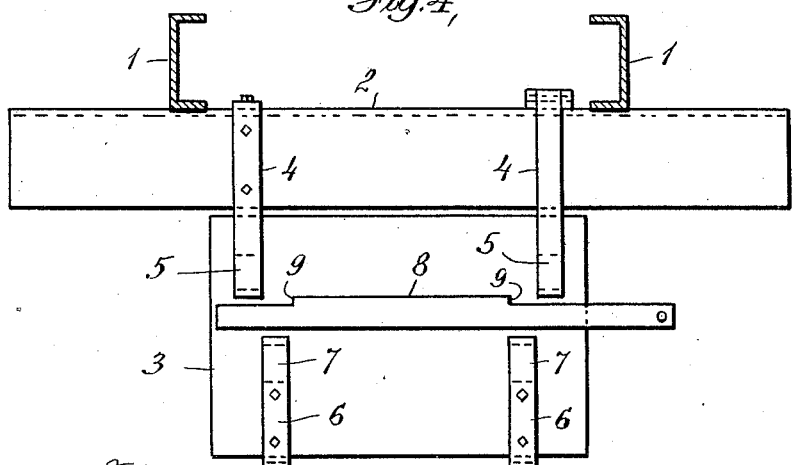

Referring to the drawings 1 indicates the chassis bars of the vehicle upon which the battery is carried. Our improved battery structure involves employing a battery whose length or dimension extending longitudinally of the vehicle is fixed but whose width may be varied over such range as may be reasonably necessary to furnish a battery of a sufficient power and energy capacity to satisfy the requirements of the service. The length of the battery is necessarily fixed due to the fact that any increase in length would encroach upon the space required by the other mechanism of the vehicle. In carrying out this idea we provide a pair of transversely extending angles 2 riveted or otherwise securely fastened to the chassis bars and extending beyond the chassis bars as shown a sufficient distance to accommodate the largest size battery which may be required. The extension beyond the chassis bars in this manner is permissible due to the fact that the truck body projects an appreciable distance over the chassis bars and a correspondingly great extension in the width of the battery itself is permissible.

The battery box 3 is supported from the transversely extending angles 2 by means of the brackets 4 secured at their upper ends to the angle, and being provided at the lower ends with a loop 5. Similar brackets 6 are provided on the battery box and have at their upper ends a pair of loops 7 which when the battery box is moved into final position on the chassis of the truck will be in alignment with the loops 5 on the battery supporting brackets 4. A locking bar 8 is then introduced through the loops 5 and 7 and serves to support the weight of the battery. The locking bar 8 is provided at its upper edge with notches 9 which engage against the sides of the loops 7 and effectually lock the bar in position. With this arrangement it will be noted that a maximum clearance beneath the bottom of the battery box is obtained, that is, it is not necessary to raise the battery during its introduction into the truck to a height substantially greater than that assumed by the battery in normal carrying position. With this construction then the top of the battery box may be brought into close proximity with the underside of the truck and the clearance beneath the battery box may be correspondingly large.

It will be understood that this type of support may be used at both front and rear of the battery box, but we have shown a different type of support at the rear of the box as a matter of illustration, showing that other types of support may be used if desired. These rear supports consist of brackets 10 supported from the angle 2, each bracket having its end shaped into a hook adapted to engage with cooperating projection 12 on the battery box support. This form of construction may be desirable in certain instances.

In mounting the battery in place on the truck the battery box is run into position underneath the truck, usually upon an hydraulic jack or other special equipment such as commonly provided in battery charging stations for the purpose. The battery is then lifted directly into position and the supporting members secured in place. When the battery is in position the vertically extending flanges of the angles 2 serve to restrain lengthwise motion of the battery. The locking bar 8, as has already been described, prevents any sidewise motion of the battery and also prevents vertical jumping of the battery due to irregularities in the road. In order to facilitate the running of the battery into position beneath the car it may be desirable to pivot one or both of the supporting brackets 4. We have here shown one of the brackets so pivoted, and this bracket may be swung into the position indicated in dotted lines in Fig. 1, so that the battery may be run into position for mounting on the truck without danger of inconvenience arising from interference with its movement by the bracket 4.

Figure 5:
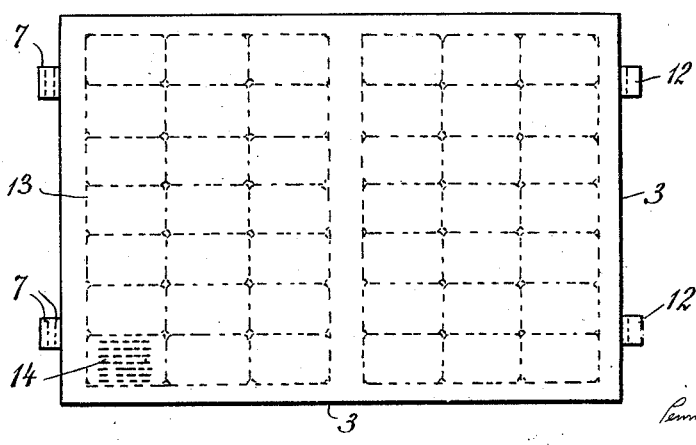
Fig. 5 is a plan view of the battery showing the construction and arrangement of the individual storage cells in the battery box.

Referring to Fig. 5, we have illustrated the construction of our improved battery. The individual battery cells 13 are mounted within battery box 3 of any appropriate construction. It is the universal practice in the manufacture of batteries for electrical vehicles to so construct the individual cells that their battery plates extend transversely of the vehicle. This practice has grown up in the trade and has persisted primarily as a matter of custom inasmuch as there does not appear to be any scientific reason why another arrangement of the plates could not be employed. In our battery, however, we arrange the plates to extend longitudinally of the vehicle as illustrated at 14. The voltage of a storage cell is determined by the materials employed in the construction of the cell, while the current capacity and the energy capacity of the cell is directly proportional to the number of plates employed. To increase the capacity of the battery it is necessary to increase the number of plates in each of the individual cells. The battery of increased capacity, therefore, contains the same number of cells as did the original battery but each cell contains a greater number of battery plates. With the arrangement of plates and cells as shown in Fig. 5 such an increase in capacity would have the effect of enlarging the widthwise dimension of the battery, which increase in dimension is accommodated by our improved battery support. In Fig. 2, for instance, a battery box 3 employing a 15 plate battery is illustrated. If, however, the truck is sent out on a hilly route and requires a greater capacity a 19 plate battery, for instance, may be substituted. This will increase the transverse dimension of the battery to the point indicated at 15. If a still larger battery is required the number of plates may be further increased and the width indicated at 17 represents the position which should be occupied by a 23 plate battery. It will thus be seen that the capacity of the battery may be easily increased more than fifty per cent without acquiring a prohibitive dimension. It will be understood that battery boxes for different size batteries are made up with identical supports so that to change from one capacity of battery to another it is merely necessary to effect the substitution by removing one and introducing the other in the usual fashion.

While we have illustrated a preferred embodiment of our invention it is to be understood that certain modifications may be made within the scope of the appended claims.

We claim:

1. In an electric vehicle, a battery support comprising a pair of frame members extending transversely of the vehicle and being spaced apart a fixed distance longitudinally of the vehicle, a battery for supplying driving power to said vehicle, supports on said battery having substantially closed loops at their upper ends, hangers on said frame members having substantially closed loops at their lower ends, and a locking bar for threading said respective loops to thereby support the battery and lock it in operative position with the top of said battery in close proximity to the vehicle chassis.

2. In an electric vehicle, a battery support comprising a pair of frame members extending transversely of the vehicle and spaced apart a fixed distance longitudinally of the vehicle, a battery for supplying driving power to said vehicle, supports on said battery, hangers depending from said frame members and cooperating with said supports for holding said battery elevated between said frame members and downwardly extending portions on said frame members lying in close proximity of the battery longitudinally of the vehicle.

In testimony whereof we affix our signatures.

WALTER S. WARD.
BENJAMIN H. BRITT.